(12) United States Patent
Brzezinski

(10) Patent No.: US 8,612,828 B2
(45) Date of Patent: Dec. 17, 2013

(54) ERROR CORRECTION MECHANISMS FOR 8-BIT MEMORY DEVICES

(75) Inventor: Dennis W. Brzezinski, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 589 days.

(21) Appl. No.: 12/644,779

(22) Filed: Dec. 22, 2009

(65) Prior Publication Data

US 2011/0154152 A1    Jun. 23, 2011

(51) Int. Cl.
*G11C 29/00* (2006.01)

(52) U.S. Cl.
USPC .......................................................... 714/763

(58) Field of Classification Search
USPC ........................ 714/755, 763, 764, 781, 807
See application file for complete search history.

(56) References Cited

U.S. PATENT DOCUMENTS

| | | | | |
|---|---|---|---|---|
| 5,740,188 | A * | 4/1998 | Olarig | 714/763 |
| 6,609,225 | B1 * | 8/2003 | Ng | 714/781 |
| 7,260,767 | B2 * | 8/2007 | Bhattacharya et al. | 714/782 |
| 7,272,774 | B2 * | 9/2007 | Co et al. | 714/764 |
| 8,196,009 | B2 * | 6/2012 | Bains et al. | 714/758 |
| 2004/0025105 | A1 * | 2/2004 | Doubler et al. | 714/781 |
| 2006/0200727 | A1 * | 9/2006 | Akiyama et al. | 714/763 |
| 2007/0002900 | A1 * | 1/2007 | Karkas et al. | 370/473 |
| 2007/0192667 | A1 * | 8/2007 | Nieto et al. | 714/780 |
| 2007/0226588 | A1 * | 9/2007 | Lee et al. | 714/758 |
| 2008/0005646 | A1 * | 1/2008 | Bains | 714/781 |
| 2008/0022187 | A1 * | 1/2008 | Bains | 714/763 |
| 2009/0110109 | A1 * | 4/2009 | Skerlj | 375/295 |
| 2010/0185897 | A1 | 7/2010 | Abts et al. | |

FOREIGN PATENT DOCUMENTS

| | | |
|---|---|---|
| GB | 1402613 | 8/1975 |
| WO | WO-97/01138 | 1/1997 |

OTHER PUBLICATIONS

Combined Search Report and Examination Report for GB Patent Application No. GB 1020296.8 mailed Mar. 1, 2011, 8 pgs.
Dunning, Larry A., "A SEC-BED-DED code with byte plus bit error detection", *Proceedings of IEEE 24th International Symposium on Fault-Tolerant Computing*, Jun. 15-17, 1994, 208-211.
Pontarelli, S. , et al., "Error correction codes for SEU and SEFI tolerant memory systems", *2009 24th IEEE International Symposium on Defect and Fault Tolerance in VLSI Systems*, Oct. 7-9, 2009, 425-430.

* cited by examiner

*Primary Examiner* — Scott Baderman
*Assistant Examiner* — Joseph Kudirka
(74) *Attorney, Agent, or Firm* — Blakely, Sokoloff, Taylor & Zafman LLP

(57) ABSTRACT

Described herein are 8-bit wide data error detection and correction mechanisms that require fewer memory chips and therefore provide reduces system complexity and reduced system power consumption as compared to traditional mechanisms. This technique relies on testing a fixed set of possible solutions in order to correct the fault. This error code provides a very high error detection rate, but requires a set of error trials to correct the detected faults. The extra correction latency for infrequent errors may be acceptable given a low frequency. For repeated corrections, a log may be maintained to simplify error correction.

14 Claims, 5 Drawing Sheets

CRCx8 0, 1,0,1,1,1,1,1,1
CRCx8 1, 1,1,0,0,1,1,1,0
CRCx8 2, 0,0,1,0,1,1,0,0
CRCx8 3, 1,1,0,0,0,1,1,1
CRCx8 4, 0,0,1,1,1,1,1,0
CRCx8 5, 1,1,1,0,0,0,1,1
CRCx8 6, 0,1,1,1,0,1,1,0
CRCx8 7, 0,1,1,1,0,0,1,1
CRCx8 8, 0,1,1,1,1,0,0,1
CRCx8 9, 0,1,1,0,1,1,0,1
CRCx8 10, 0,1,0,0,0,1,0,1
CRCx8 11, 0,0,0,1,0,1,0,1
CRCx8 12, 1,0,1,1,0,1,0,1
CRCx8 13, 1,1,0,1,1,0,1,0
CRCx8 14, 0,0,0,0,0,1,0,0
CRCx8 15, 1,0,0,1,0,1,1,1
CRCx8 16, 1,0,0,1,1,1,1,0
CRCx8 17, 1,0,0,0,1,1,0,0
CRCx8 18, 1,0,1,0,1,0,0,0
CRCx8 19, 1,1,1,0,0,0,0,0
CRCx8 20, 0,1,1,1,0,0,0,0
CRCx8 21, 0,1,1,1,1,1,1,1
CRCx8 22, 0,1,1,0,0,0,0,1
CRCx8 23, 0,1,0,1,1,1,0,1
CRCx8 24, 0,0,1,0,0,1,0,1
CRCx8 25, 1,1,0,1,0,1,0,1
CRCx8 26, 0,0,0,1,1,0,1,0
CRCx8 27, 1,0,1,0,1,0,1,1
CRCx8 28, 1,1,1,0,0,1,1,0
CRCx8 29, 0,1,1,1,1,1,0,0
CRCx8 30, 0,1,1,0,0,1,1,1
CRCx8 31, 0,1,0,1,0,0,0,1
CRCx8 32, 0,0,1,1,1,1,0,1
CRCx8 33, 1,1,1,0,0,1,0,1
CRCx8 34, 0,1,1,1,1,0,1,0
CRCx8 35, 0,1,1,0,1,0,1,1
CRCx8 36, 0,1,0,0,1,0,0,1
CRCx8 37, 0,0,0,0,1,1,0,1
CRCx8 38, 1,0,0,0,0,1,0,1
CRCx8 39, 1,0,1,1,1,0,1,0
CRCx8 40, 1,1,0,0,0,1,0,0
CRCx8 41, 0,0,1,1,1,0,0,0
CRCx8 42, 1,1,1,0,1,1,1,1
CRCx8 43, 0,1,1,0,1,1,1,0
CRCx8 44, 0,1,0,0,0,0,1,1
CRCx8 45, 0,0,0,1,1,0,0,1
CRCx8 46, 1,0,1,0,1,1,0,1
CRCx8 47, 1,1,1,0,1,0,1,0
CRCx8 48, 0,1,1,0,0,1,0,0
CRCx8 49, 0,1,0,1,0,1,1,1
CRCx8 50, 0,0,1,1,0,0,0,1
CRCx8 51, 1,1,1,1,1,1,0,1
CRCx8 52, 0,1,0,0,1,0,1,0
CRCx8 53, 0,0,0,0,1,0,1,1
CRCx8 54, 1,0,0,0,1,0,0,1
CRCx8 55, 1,0,1,0,0,0,1,0
CRCx8 56, 1,1,1,1,0,1,0,0
CRCx8 57, 0,1,0,1,1,0,0,0
CRCx8 58, 0,0,1,0,1,1,1,1
CRCx8 59, 1,1,0,0,0,0,0,1
CRCx8 60, 0,0,1,1,0,0,1,0
CRCx8 61, 1,1,1,1,1,0,1,1
CRCx8 62, 0,1,0,0,0,1,1,0
CRCx8 63, 0,0,0,1,0,0,1,1
CRCx8 64, 1,0,1,1,1,0,0,1
CRCx8 65, 1,1,0,0,0,0,1,0
CRCx8 66, 0,0,1,1,0,1,0,0
CRCx8 67, 1,1,1,1,0,1,1,1
CRCx8 68, 0,1,0,1,1,1,1,0
CRCx8 69, 0,0,1,0,0,0,1,1
CRCx8 70, 1,1,0,1,1,0,0,1
CRCx8 71, 0,0,0,0,0,0,1,0

Fig. 2

CRCx8 0,  1,0,1,1,1,1,1,1
CRCx8 1,  1,1,0,0,1,1,1,0
CRCx8 2,  0,0,1,0,1,1,0,0
CRCx8 3,  1,1,0,0,0,1,1,1
CRCx8 4,  0,0,1,1,1,1,1,0
CRCx8 5,  1,1,1,0,0,0,1,1
CRCx8 6,  0,1,1,1,0,1,1,0
CRCx8 7,  0,1,1,1,0,0,1,1
CRCx8 8,  0,1,1,1,1,0,0,1
CRCx8 9,  0,1,1,0,1,1,0,1
CRCx8 10, 0,1,0,0,0,1,0,1
CRCx8 11, 0,0,0,1,0,1,0,1
CRCx8 12, 1,0,1,1,0,1,0,1
CRCx8 13, 1,1,0,1,1,0,1,0
CRCx8 14, 0,0,0,0,0,1,0,0
CRCx8 15, 1,0,0,1,0,1,1,1
CRCx8 16, 1,0,0,1,1,1,1,0
CRCx8 17, 1,0,0,0,1,1,0,0
CRCx8 18, 1,0,1,0,1,0,0,0
CRCx8 19, 1,1,1,0,0,0,0,0
CRCx8 20, 0,1,1,1,0,0,0,0
CRCx8 21, 0,1,1,1,1,1,1,1
CRCx8 22, 0,1,1,0,0,0,0,1
CRCx8 23, 0,1,0,1,1,1,0,1
CRCx8 24, 0,0,1,0,0,1,0,1
CRCx8 25, 1,1,0,1,0,1,0,1
CRCx8 26, 0,0,0,1,1,0,1,0
CRCx8 27, 1,0,1,0,1,0,1,1
CRCx8 28, 1,1,1,0,0,1,1,0
CRCx8 29, 0,1,1,1,1,1,0,0
CRCx8 30, 0,1,1,0,0,1,1,1
CRCx8 31, 0,1,0,1,0,0,0,1
CRCx8 32, 0,0,1,1,1,1,0,1
CRCx8 33, 1,1,1,0,0,1,0,1
CRCx8 34, 0,1,1,1,1,0,1,0
CRCx8 35, 0,1,1,0,1,0,1,1

CRCx8 36, 0,1,0,0,1,0,0,1
CRCx8 37, 0,0,0,0,1,1,0,1
CRCx8 38, 1,0,0,0,0,1,0,1
CRCx8 39, 1,0,1,1,1,0,1,0
CRCx8 40, 1,1,0,0,0,1,0,0
CRCx8 41, 0,0,1,1,1,0,0,0
CRCx8 42, 1,1,1,0,1,1,1,1
CRCx8 43, 0,1,1,0,1,1,1,0
CRCx8 44, 0,1,0,0,0,0,1,1
CRCx8 45, 0,0,0,1,1,0,0,1
CRCx8 46, 1,0,1,0,1,1,0,1
CRCx8 47, 1,1,1,0,1,0,1,0
CRCx8 48, 0,1,1,0,0,1,0,0
CRCx8 49, 0,1,0,1,0,1,1,1
CRCx8 50, 0,0,1,1,0,0,0,1
CRCx8 51, 1,1,1,1,1,1,0,1
CRCx8 52, 0,1,0,0,1,0,1,0
CRCx8 53, 0,0,0,0,1,0,1,1
CRCx8 54, 1,0,0,0,1,0,0,1
CRCx8 55, 1,0,1,0,0,0,1,0
CRCx8 56, 1,1,1,1,0,1,0,0
CRCx8 57, 0,1,0,1,1,0,0,0
CRCx8 58, 0,0,1,0,1,1,1,1
CRCx8 59, 1,1,0,0,0,0,0,1
CRCx8 60, 0,0,1,1,0,0,1,0
CRCx8 61, 1,1,1,1,1,0,1,1
CRCx8 62, 0,1,0,0,0,1,1,0
CRCx8 63, 0,0,0,1,0,0,1,1
CRCx8 64, 1,0,1,1,1,0,0,1
CRCx8 65, 1,1,0,0,0,0,1,0
CRCx8 66, 0,0,1,1,0,1,0,0
CRCx8 67, 1,1,1,1,0,1,1,1
CRCx8 68, 0,1,0,1,1,1,1,0
CRCx8 69, 0,0,1,0,0,0,1,1
CRCx8 70, 1,1,0,1,1,0,0,1
CRCx8 71, 0,0,0,0,0,0,1,0

Fig. 3

ERROR CORRECTION MECHANISMS FOR 8-BIT MEMORY DEVICES

TECHNICAL FIELD

Embodiments of the invention relate to error correction for memory devices. More particularly, embodiments of the invention relate to techniques to provide error correction for memory devices that can both improve performance and reduce power consumption as compared to traditional error correction techniques.

BACKGROUND

Memory device failures result in system down time and/or incorrect results. In response, various error detection and/or error correction mechanisms have been developed. Basic mechanisms involve parity checking. More advanced techniques provide for error correction. For example, a memory module may include multiple 8-bit memory integrated circuit (IC) packages to store data and an additional 8-bit IC memory package to store error correcting code (ECC) bits corresponding to data stored in the other ICs.

The most common computer memory uses either 4-bit or 8-bit wide dynamic random access memory (DRAM) chips, soldered onto a single sided printed circuit board (PCB) in line memory module called a single inline memory module (SIMM), or dual printed circuit board in line memory module, or dual inline memory module (DIMM). These SIMMs and DIMMs are plugged into sockets on a computer to construct the memory subsystem.

It is not uncommon for a server class computer to have from 32 to 128 memory DIMMs with from 288 to 9,216 DRAMs, and a fault in this large number of integrated circuits and connection sockets running at high signaling frequencies can create errors that can either silently corrupt important data, or force the application to terminate when uncorrectable faults are detected. Error classes can be divided into permanent, persistent and transient errors. Transient errors are further divided into event errors and margin errors. Radiation-induced DRAM soft errors are a form of event errors. Signaling induced faults are a form of margin errors.

Various strategies have been developed to address errors. For example, redundant memory may be added to support error detection and correction coding. In the computer industry DRAM memory modules with 64 data bits and 8 redundant correction bits have become the high volume standard.

One effective ECC mechanism is referred to as x4 Single Data Device Correction (SDDC) that is designed to recover from a single DRAM chip failure for 4-bit memory devices. Similarly x8 SDDC is designed to recover from a DRAM chip failure for 8-bit memory devices. Current memory SDDC generally requires 18 or 36 DRAM chips in order to provide sufficient redundancy for a fully deterministic logic gate solution. The memory data and check bits are inputs to a combinatorial logic block that generates a DRAM error locator vector to identify the failure. The combinatorial logic block may also output a bit correction vector that can be used to correct (e.g., flip-bit) data in the faulty DRAM chip.

Performance per watt modeling has proven that transferring 64 Byte memory blocks for each read and write operation provides optimal efficiency. To deliver 64 Bytes some SDDC error codes send one identical address to two x4 DIMMs in a lockstep channel delivering 144 information bits per I/O clock. This arrangement of thirty-two x4 data DRAMs plus four x4 correction bit DRAMs provides enough redundancy for x4 SDDC while delivering a 64 Byte memory block in 4 I/O clocks. Some SDDC error codes send a unique address to each independent channel x4 DIMM delivering 72 information bits per I/O clock. This arrangement of sixteen x4 data DRAMs plus two x4 correction bit DRAMs provides enough redundancy for x4 SDDC while delivering a 64 Byte memory block in a more power efficient 8 I/O clocks.

Error correction theory has proven that it is not possible to build fully deterministic hardware for perfect x8 SDDC on independent channel x8 ECC DIMMs, despite the power efficiency of enabling just nine x8 DRAMs for 8 I/O bursts to deliver one 64 Byte memory block.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 illustrates one embodiment of a table of error vectors that may be used with the CRC polynomial $P(x)=x^8+x^5+x^3+x^2+x+1$ to detect and correct a single bit error in a 72-bit codeword.

FIG. 3 illustrates one embodiment of a table of error vectors that may be used with the CRC polynomial $P(x)=x^8+x^2+1$ to detect and correct a single bit error in a 72-bit codeword.

DETAILED DESCRIPTION

Figure 1:
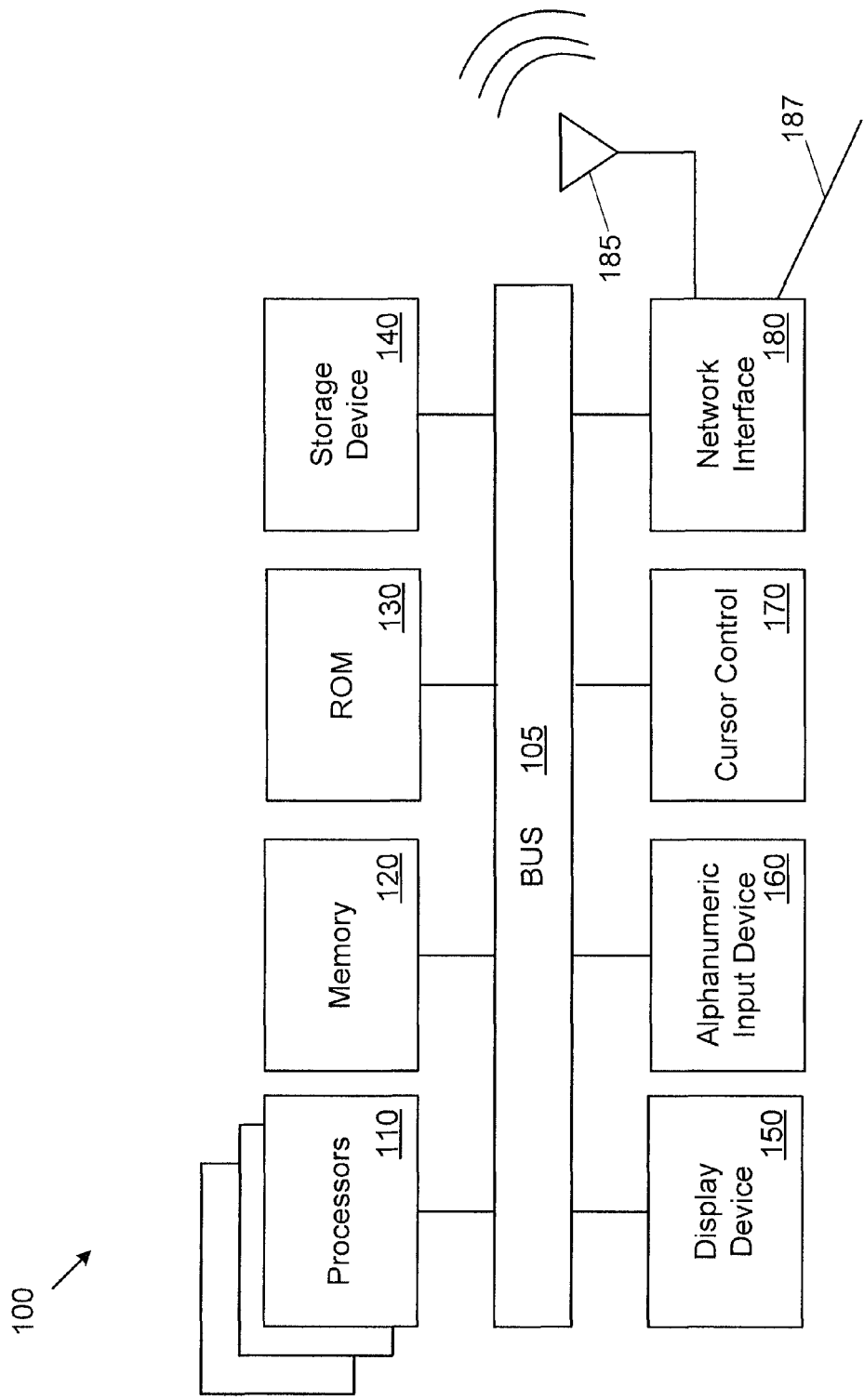
FIG. 1 is a block diagram of one embodiment of an electronic system.

In the following description, numerous specific details are set forth. However, embodiments of the invention may be practiced without these specific details. In other instances, well-known circuits, structures and techniques have not been shown in detail in order not to obscure the understanding of this description.

Transient faults are signaling margin faults and neutron faults in the DRAM control logic. The techniques described herein provide strong detection and correction for transient faults. These transient faults are generally removed via re-reading the memory location.

One-bit persistent faults such as neutron 1-bit errors in the DRAM array are detected and corrected by the techniques described herein. Multi-bit persistent faults as might be generated from a neutron strike to the DRAM array are much less common and are detected, but not corrected by the techniques described herein.

Permanent faults, also called hard errors, result from a DRAM failure or a socket failure. The techniques described herein provide for detection and correction of both single-bit and 8-bit symbol permanent faults. In one embodiment, a table or a log of which DRAM had repeating previous errors may be maintained to reduce the time required to correct permanent faults.

Transient memory errors from neutrons strikes to DRAM control logic and signaling faults occur infrequently, and their correction latency has little effect on performance. In one embodiment, when an error is detected the memory controller re-reads the data in an attempt to identify and remove any poor margin transient signaling faults. If the memory fault remains after this second read, the memory controller inverts the data and writes this inverted data back to memory, and then reads the inverted data to identify stuck at 1 and stuck at 0 permanent faults. This information is used to locate the 8-bit symbol containing faulty data from a DRAM or socket pin.

If no permanent fault is detected after the second read, the checksum is compared to the 72 entry table of 8-bit error identifiers as described in FIG. 3, and if a match is found, the corresponding 1-bit persistent error can be corrected by inverting the identified bit in the codeword. If no permanent fault is detected after the second read, and no match is found in the 72 entry 8-bit error identifier table, then a multiple bit persistent faults exists than cannot be corrected, and the memory controller signals an uncorrectable error state.

Described herein are SDDC mechanisms that require fewer memory chips and therefore provide reduces system complexity and reduced system power consumption as compared to traditional SDDC mechanisms. In one embodiment, only nine 8-bit wide memory chips (e.g., dynamic random access memories, or DRAMs) are utilized for x8 SDDC. This technique relies on testing a fixed set of possible solutions in order to correct the fault. This error code provides a very high error detection rate, but requires a set of error trials to correct the detected faults. The extra correction latency for infrequent errors (e.g., neutron soft errors) may be acceptable given its low frequency of occurrence. For repeated corrections (e.g., a permanently failed location or chip), a log may be maintained of which DRAM contains the permanent faults to simplify error correction.

In one embodiment, an 8-bit cyclic redundancy check (CRC) polynomial that can be used to uniquely identify 1-bit faults can be used to generate a 72-entry, 8-bit checksum error vector table to correct the most common transient faults. This polynomial also provides strong triple bit error detection plus single 8-bit symbol detection for permanent fault SDDC.

Error protection theory indicates that a fully deterministic combinatorial logic x8 SDDC mechanism requires at least 16 check bits. The techniques described herein provide single bit error correction plus x8 SDDC of all permanent faults, but infrequent multiple bit neutron data array write faults are only detected and not correctable. The technique described herein may provide x8 SDDC with just 8 check bits by using a look up table to correct 1-bit transient faults, plus data inversion testing to identify which memory chip has a permanent fault that can be corrected through a series of trials. Thus, the technique described herein requires fewer resources than traditional x8 SDDC.

In one embodiment, the error detection and correction techniques described herein are implemented as integrated circuitry, instructions stored in one or more system components (e.g., memory controller, processor), or any combination thereof. In one embodiment, the mechanisms for providing error detection and correction are in components other than the memory modules, which allows standard memory components (e.g., DIMMS) to be used.

FIG. 1 is a block diagram of one embodiment of an electronic system. The electronic system illustrated in FIG. 1 is intended to represent a range of electronic systems (either wired or wireless) including, for example, desktop computer systems, laptop computer systems, server systems, etc. Alternative electronic systems may include more, fewer and/or different components.

Electronic system 100 includes bus 105 or other communication device to communicate information, and processor(s) 110 coupled to bus 105 that may process information. Electronic system 100 further may include random access memory (RAM) or other dynamic storage device 120 (referred to as memory), coupled to bus 105 and may store information and instructions that may be executed by processor 110. Memory 120 may also be used to store temporary variables or other intermediate information during execution of instructions by processor(s) 110.

In one embodiment, the error detection and correction mechanisms described herein may be utilized when reading and writing data to memory 120. A memory controller may be included in one or more processor(s) 110 or may be coupled with bus 105. The memory controller(s) provide an interface to the physical memory devices (e.g., SIMMs or DIMMs having multiple DRAM chips) that store the data.

Electronic system 100 may also include read only memory (ROM) and/or other static storage device 130 coupled to bus 105 that may store static information and instructions for processor 110. Data storage device 140 may be coupled to bus 105 to store information and instructions. Data storage device 140 such as a magnetic disk or optical disc and corresponding drive may be coupled to electronic system 100.

Electronic system 100 may also be coupled via bus 105 to display device 150, such as a cathode ray tube (CRT) or liquid crystal display (LCD), to display information to a user. Alphanumeric input device 160, including alphanumeric and other keys, may be coupled to bus 105 to communicate information and command selections to processor 110. Another type of user input device is cursor control 170, such as a mouse, a trackball, or cursor direction keys to communicate direction information and command selections to processor 110 and to control cursor movement on display 150.

Electronic system 100 further may include network interface(s) 180 to provide access to a network, such as a local area network. Network interface(s) 180 may include, for example, a wireless network interface having antenna 185, which may represent one or more antenna(e). Network interface(s) 180 may also include, for example, a wired network interface to communicate with remote devices via network cable 187, which may be, for example, an Ethernet cable, a coaxial cable, a fiber optic cable, a serial cable, or a parallel cable.

In one embodiment, network interface(s) 180 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 180 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In various embodiments, different polynomial equations may be utilized to produce checksum values. The description that follows is based around two embodiments utilizing two polynomials. Alternate embodiments can be implemented using the same concepts while utilizing other polynomials. The two polynomials described provide maximum error detection and minimum gate count, respectively.

In one embodiment, the 8th order polynomial $$P(x)=x^8+x^5+x^3+x^2+x+1$$

is used to generate a cyclic redundancy checksum which provides triple bit error detection over each 72-bit transfer plus 8-bit symbol error detection over each x8 DRAM data transfer. In one embodiment, the CRC hardware is constructed from 334 2-input XOR gates in a 6-deep tree. In alternate embodiments, other tree structures may be utilized.

In this embodiment, the following equations (where "^" indicates an XOR function) may be used:

Ck Sum Bit 0=(D[70]^D[69]^D[67]^D[64]^D[63]^D[61] ^D[59]^D[58]^D[54]^ D[53]^D[51]^D[50]^D[49]^D[46] ^D[45]^D[44]^D[42]^D[38]^D[37]^D[36]^D[35]^ D[33] ^D[32]^D[31]^D[30]^D[27]^D[25]^D[24]^D[23]^D[22] ^D[21]^D[15]^D[12]^ D[11]^D[10]^D[9]^D[8]^D[7]^D [5]^D[3]^D[0])

Ck Sum Bit 1=(D[71]^D[69]^D[68]^D[67]^D[65]^D[63] ^D[62]^D[61]^D[60]^ D[58]^D[55]^D[53]^D[52]^D[49] ^D[47]^D[44]^D[43]^D[42]^D[39]^D[35]^D[34]^ D[30] ^D[28]^D[27]^D[26]^D[21]^D[16]^D[15]^D[13]^D[7] ^D[6]^D[5]^D[4]^ D[3]^D[1]^D[0])

Ck Sum Bit 2=(D[68]^D[67]^D[66]^D[62]^D[58]^D[56] ^D[51]^D[49]^D[48]^ D[46]^D[43]^D[42]^D[40]^D[38] ^D[37]^D[33]^D[32]^D[30]^D[29]^D[28]^D[25]^ D[24] ^D[23]^D[21]^D[17]^D[16]^D[15]^D[14]^D[12]^D[11] ^D[10]^D[9]^D[6]^ D[4]^D[3]^D[2]^D[1]^D[0])

Ck Sum Bit 3=(D[70]^D[68]^D[64]^D[61]^D[58]^D[57] ^D[54]^D[53]^D[52]^ D[51]^D[47]^D[46]^D[45]^D[43] ^D[42]^D[41]^D[39]^D[37]^D[36]^D[35]^D[34]^ D[32] ^D[29]^D[27]^D[26]^D[23]^D[21]^D[18]^D[17]^D[16] ^D[13]^D[9]^D[8]^ D[4]^D[2]^D[1]^D[0])

Ck Sum Bit 4=(D[71]^D[69]^D[65]^D[62]^D[59]^D[58] ^D[55]^D[54]^D[53]^ D[52]^D[48]^D[47]^D[46]^D[44] ^D[43]^D[42]^D[40]^D[38]^D[37]^D[36]^D[35]^ D[33] ^D[30]^D[28]^D[27]^D[24]^D[22]^D[19]^D[18]^D[17] ^D[14]^D[10]^D[9]^ D[5]^D[3]^D[2]^D[1])

Ck Sum Bit 5=(D[69]^D[67]^D[66]^D[64]^D[61]^D[60] ^D[58]^D[56]^D[55]^ D[51]^D[50]^D[48]^D[47]^D[46] ^D[43]^D[42]^D[41]^D[39]^D[35]^D[34]^D[33]^ D[32] ^D[30]^D[29]^D[28]^D[27]^D[24]^D[22]^D[21]^D[20] ^D[19]^D[18]^ D[12]^D[9]^D[8]^D[7]^D[6]^D[5]^D[4] ^D[2]^D[0])

Ck Sum Bit 6=(D[70]^D[68]^D[67]^D[65]^D[62]^D[61] ^D[59]^D[57]^D[56]^ D[52]^D[51]^D[49]^D[48]^D[47] ^D[44]^D[43]^D[42]^D[40]^D[36]^D[35]^D[34]^ D[33] ^D[31]^D[30]^D[29]^D[28]^D[25]^D[23]^D[22]^D[21] ^D[20]^D[19]^D[13]^ D[10]^D[9]^D[8]^D[7]^D[6]^D [5]^D[3]^D[1])

Ck Sum Bit 7=(D[71]^D[69]^D[68]^D[66 ]^D[63]^D[62] ^D[60]^D[58]^D[57]^ D[53]^D[52]^D[50]^D[49]^D[48] ^D[45]^D[44]^D[43]^D[41]^D[37]^D[36]^D[35]^ D[34] ^D[32]^D[31]^D[30]^D[29]^D[26]^D[24]^D[23]^D[22] ^D[21]^D[20]^D[14]^ D[11]^D[10]^D[9]^D[8]^D[7]^D [6]^D[4]^D[2])

FIG. 2 illustrates one embodiment of a table of error vectors that may be used with the CRC polynomial $P(x)=x^8+x^5+x^3+x^2+x+1$. When the retrieved data and checksum bits are retrieved and evaluated using the CRC polynomial, a zero result indicates no error. A non-zero result indicates an error and provides information regarding the error and correction in many cases.

In one embodiment, if a permanent fault is identified, the location of the failed DRAM or socket pin symbol is recorded in the memory controller, and up to 256 bit flip trials are performed on the failed 8-bit symbol data until the checksum equals zero. When the trials checksum is zero, the data has been corrected. Multiple CRC logic blocks can be built and pipelined to minimize the latency of these trials. The memory controller stores which DRAM in each memory rank has permanent failures, and this information may be used to reduce correction latency when that failed DRAM is frequently read.

In one embodiment, if no permanent fault is identified, the memory controller compares the 8-bit checksum error vector against a 72 entry table of 1-bit fault identifiers. If the checksum matches an entry in this table, that one data bit is inverted and the checksum is again calculated. An all zero checksum indicates that a single bit neutron error at the identified location was corrected. Any non-zero checksum signals a detected uncorrectable multi-bit neutron fault. This 72 entry single bit fault table is also checked during a tagged DRAM SDDC correction to catch a random 1-bit neutron fault occurring at an address where no permanent fault exists in the tagged SDDC DRAM rank.

In one embodiment, the 8th order polynomial $$P(x)=x^8+x^2+1$$

is used to generate a cyclic redundancy checksum which provides triple bit error detection over each 72-bit transfer plus 8-bit symbol detection over each x8 DRAM data transfer. In one embodiment, the CRC hardware is constructed from 272 2-input XOR gates in a 6-deep tree. In alternate embodiments, other tree structures may be utilized.

In this embodiment, the following equations (where "^" indicates an XOR function) may be used:

Ck Sum Bit 0=(D[69]^D[68]^D[67]^D[66]^D[64]^D[63] ^D[60]^D[56]^D[54]^D[53]^D[52]^D[50]^D[49]^D[48] ^D[45]^D[43]^D[40]^D[39]^D[35]^D[34]^D[31]^D[30] ^D[28]^D[23]^D[21]^D[19]^D[18]^D[16]^D[14]^D[12] ^D[8]^D[7]^D[6]^D[0])

Ck Sum Bit 1=(D[70]^D[66]^D[65]^D[63]^D[61]^D[60] ^D[57]^D[56]^D[55]^D[52]^D[51]^D[48]^D[46]^D[45] ^D[44]^D[43]^D[41]^D[39]^D[36]^D[34]^D[32]^D[30] ^D[29]^D[28]^D[24]^D[23]^D[22]^D[21]^D[20]^D[18] ^D[17]^D[16]^D[15]^D[14]^D[13]^D[12]^D[9]^D[6]^D [1]^D[0])

Ck Sum Bit 2=(D[71]^D[69]^D[68]^D[63]^D[62]^D[61] ^D[60]^D[58]^D[57]^D[54]^D[50]^D[48]^D[47]^D[46] ^D[44]^D[43]^D[42]^D[39]^D[37]^D[34]^D[33]^D[29] ^D[28]^D[25]^D[24]^D[22]^D[17]^D[15]^D[13]^D[12] ^D[10]^D[8]^D[6]^D[2]^D[1]^D[0])

Ck Sum Bit 3=(D[70]^D[69]^D[64]^D[63]^D[62]^D[61]^p [59]^D[58]^D[55]^D[51]^D[49]^D[48]^D[47]^D[45]^D [44]^D[43]^D[40]^D[38]^D[35]^D[34]^D[30]^D[29]^D [26]^D[25]^D[23]^D[18]^D[16]^D[14]^D[13]^D[11]^D [9]^D[7]^D[3]^D[2]^D[1])

Ck Sum Bit 4=(D[71]^D[70]^D[65]^D[64]^D[63]^D[62] ^D[60]^D[59]^D[56]^D[52]^D[50]^D[49]^D[48]^D[46]

^D[45]^D[44]^D[41]^D[39]^D[36]^D[35]^D[31]^D[30]
^D[27]^D[26]^D[24]^D[19]^D[17]^p[15]^D[14]^D[12]
^D[10]^D[8]^D[4]^D[3]^D[2])

Ck Sum Bit 5=(D[71]^D[66]^D[65]^D[64]^D[63]^D[61]
^D[60]^D[57]^ D[53]^D[51]^D[50]^D[49]^D[47]^D[46]
^D[45]^D[42]^D[40]^D[37]^D[36]^D[32]^D[31]^D[28]
^D[27]^D[25]^D[20]^D[18]^D[16]D[15]^D[13]^D[11]
^D[9]^D[5]^D[4]^D[3])

Ck Sum Bit 6=(D[67]^D[66]^D[65]^D[64]^D[62]^D[61]
^D[58]^D[54]^D[52]^D[51]^D[50]^D[48]^D[47]^D[46]
^D[43]^D[41]^D[38]^D[37]^D[33]^D[32]^D[29]^D[28]
^D[26]^D[21]^D[19]^D[17]^D[16]^D[14]^D[12]^D[10]
^D[6]^D[5]^D[4])

Ck Sum Bit 7=(D[68]^D[67]^D[66]^D[65]^D[63]^D[62]
^D[59]^D[55]^ D[53]^D[52]^D[51]^D[49]^D[48]^D[47]
^D[44]^D[42]^D[39]^D[38]^D[34]^D[33]^D[30]^D[29]
^D[27]^D[22]^D[20]^D[18]^D[17]^D[15]^D[13]^D[11]
^D[7]^D[6]^D[5])

FIG. 3 illustrates one embodiment of a table of error vectors that may be used with the CRC polynomial $P(x)=x^8+x^2+1$. When the retrieved data and checksum bits are retrieved and evaluated using the CRC polynomial, a zero result indicates no error. A non-zero result indicates an error and provides information regarding the error and correction in many cases.

Each 1 bit fault has a unique checksum in the 72-bit codeword. This can be used to correct 1-bit neutron persistent faults. Multiple bit faults can alias to the 1 bit fault checksums. This is why read-invert-write-read is performed to identify which DRAM has any permanent stuck at 1 or 0 faults.

Figure 4:
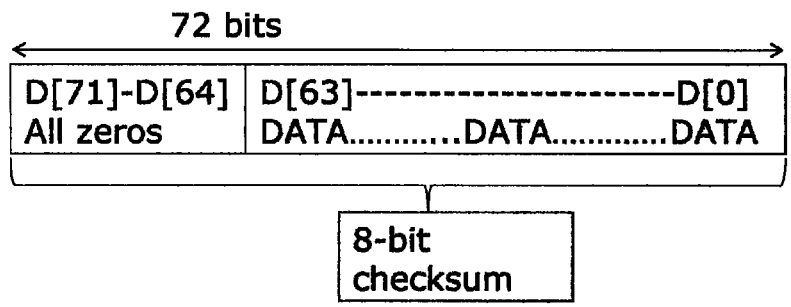
FIG. 4 is a conceptual illustration of computation of an 8-bit checksum for a 64-bit block of data.

FIG. 4 is a conceptual illustration of computation of an 8-bit checksum for a 64-bit block of data. In one embodiment, a 72-bit block is constructed by combining a 64-bit block of data to be stored in memory with an 8-bit segment that is used to generate an 8-bit checksum value. The checksum value can be generated using the polynomials described above.

Figure 5:
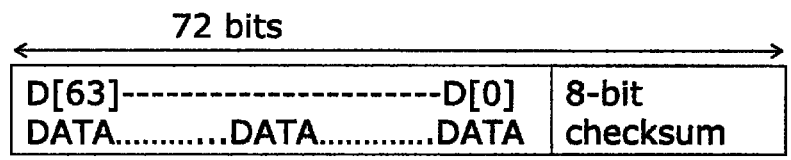
FIG. 5 is a conceptual illustration of a 72-bit block to be written to memory that includes a 64-bit block of data and an 8-bit checksum.

FIG. 5 is a conceptual illustration of a 72-bit block to be written to memory that includes a 64-bit block of data and an 8-bit checksum. In one embodiment, the 72-bit block to be written to memory includes the 64 data bits logically shifted to the left 8 bits with the 8-bit checksum value concatenated as the lower 8 bits. That is bits 8 to 71 contain the 64 bits of data and bits 0 to 7 contain the 8-bit checksum value. This embodiment generates an all zero checksum during the memory controller read operation if no faults exist. Other configurations can also be used. For example, the checksum value may be stored as the upper 8 bits of the 72-bit data block, and manipulated by the memory controller logic to provide the proper error detection.

Figure 6:
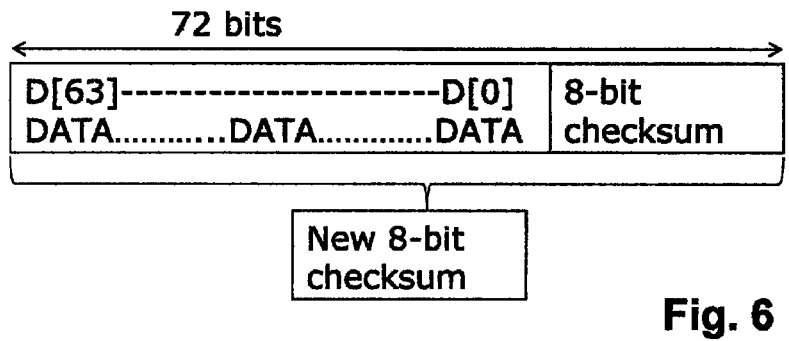
FIG. 6 is a conceptual illustration of a 72-bit block read from memory that includes a 64-bit block of data and an 8-bit checksum that is checked for errors.

FIG. 6 is a conceptual illustration of a 72-bit block read from memory that includes a 64-bit block of data and an 8-bit checksum that is checked for errors. If no errors have occurred, the 72-bit block of FIG. 6 is identical to the 72-bit block of FIG. 5. However, if an error has occurred, one or more bits differ between the 72-bit block of FIG. 6 and the 72-bit block of FIG. 5.

In order to determine if an error has occurred, a new 8-bit checksum value for the 72-bit block of data retrieved from memory is generated. In one embodiment, the checksum value for the block read from memory is generated using the same polynomial as the checksum value generated for the data illustrated in FIG. 4. If the new 8-bit checksum value is all zeros (i.e., 00000000), then no error has occurred and the 64 data bits may be extracted and used. If the new 8-bit checksum value is non-zero, then an error has occurred and may be corrected as described above.

Figure 7:
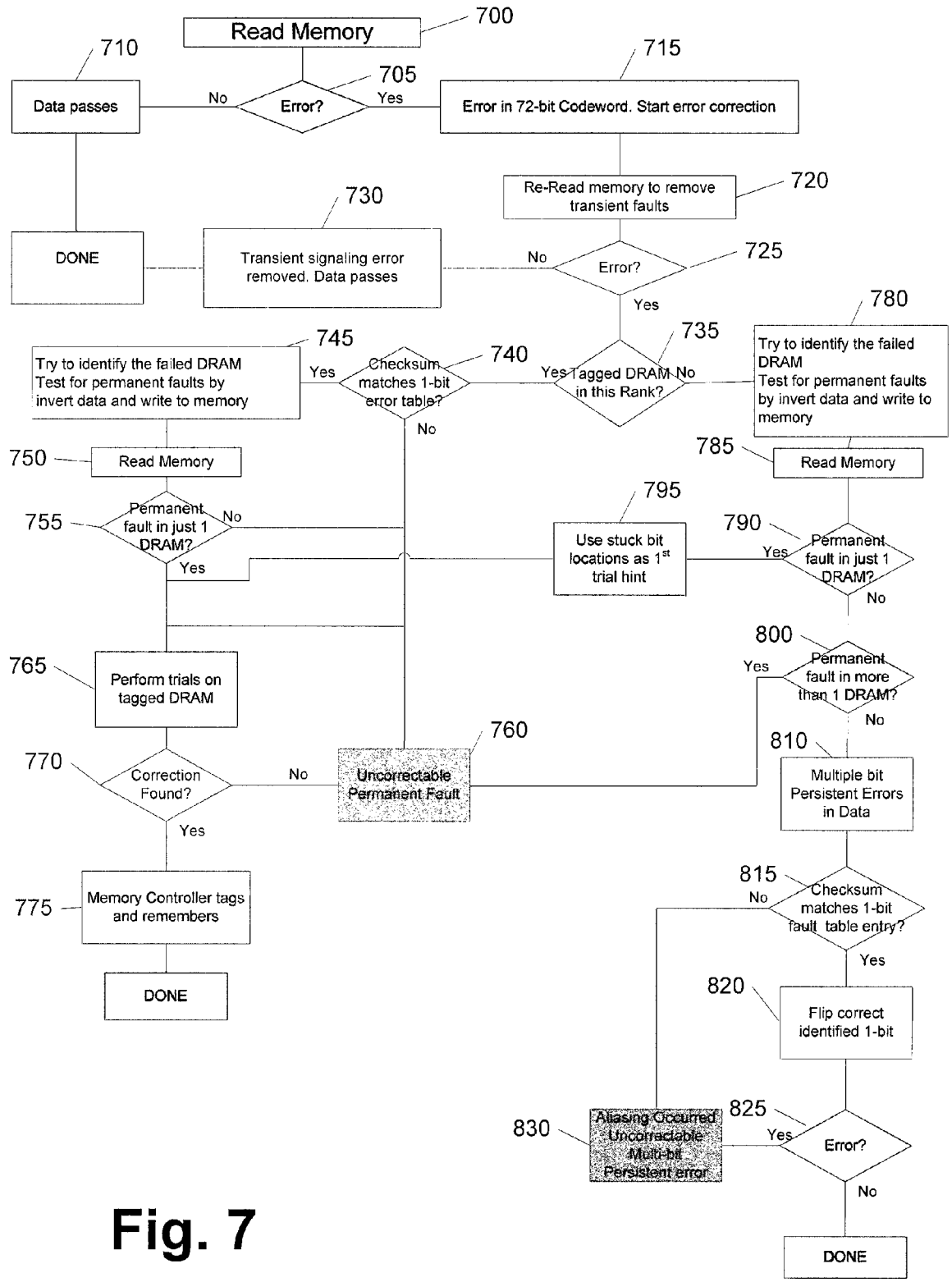
FIG. 7 is a flow diagram of one embodiment of an error correction technique utilizing checksum values.

FIG. 7 is a flow diagram of one embodiment of an error correction technique utilizing checksum values for data read from memory. A block of data is read from memory, 700. In one embodiment, the block of data read from memory is configured as illustrated in FIG. 6. A checksum value is determined for the block of data and if there is no error, 705, the data is used, 710.

If the checksum value indicates an error, 705, error correction is initiated, 715. In one embodiment, the first error correction action is to re-read the data from memory to remove transient faults, 720. A checksum value is generated for the re-read data and checked for an error, 725. If there is no error, 725, then the transient signaling error has been removed, 730 and the data may be used.

If an error has been detected, 725, the memory controller can determine if a memory device (e.g., DRAM) in the rank being read has been tagged has having a permanent error, 735. If the memory device has been tagged, 735, the generated checksum value may be compared to an error table, 740. In one embodiment, the error table stores one unique 8-bit checksum error indicator for each of the 72 bits to provide efficient correction of all 1-bit persistent and permanent faults.

Information from the error table can be used to identify a failed memory device and avoid potential aliasing issues with other memory devices. In one embodiment, the memory controller can test for permanent faults by inverting the data and re-writing the inverted data to memory, 745. The inverted data is read from memory, 750.

If the result of reading the inverted data indicates a permanent fault in multiple memory devices, 755, then an uncorrectable permanent fault has been found, 760, and cannot be corrected. If the result of reading the inverted data indicates a permanent fault in only one memory device, 755, error correction trials are performed on the date, 765.

In one embodiment, error correction trials may be accomplished by generating a checksum value for the data plus each possible iteration of the checksum value until a resulting checksum indicating no error is generated. For a system using 8-bit checksum values, this can be up to 256 iterations. If one of the iterations results in a no error checksum value, 770, then the corresponding data value is the correct value and can be used.

If none of the iterations results in a no error checksum value, 770, then an uncorrectable permanent fault exists, 760. In one embodiment, the memory controller tags the bad memory device 775, so that subsequent corrections can be made without the iterative correction process described above.

Returning to use of the checksum table, 740, if the checksum does not match the table, the iterative trial process is initiated, 765. Correction, 770, or identification of an uncorrectable permanent fault, 760, proceeds as described above.

Returning to determining if the memory device has been tagged, 735, if not, then the memory controller can test for permanent faults by inverting the data, writing the data to memory, 780. The memory location is re-read, 785. If reading the inverted data indicates a permanent fault in only one memory device, 790, the stuck bit locations determined by the read-invert-write-read process can be used as "hints" as to fault locations. Correction trial iterations can be performed using error vectors corresponding to these locations first, which may result in fewer iterations to find the correct result, 765.

If permanent faults are found in multiple memory locations, 800, an uncorrectable permanent fault has been found, 760. If there are multiple bit errors that are not permanent faults, 785 and 790, there is a multiple-bit persistent soft error, 810. If the checksum value matches a one-bit fault in the table, 810, the identified bit can be flipped, 820, to attempt to correct the persistent soft error. A checksum value is generated for the data with the flipped bit to determine if an error persists, 825, which indicates that aliasing has occurred and an uncorrectable multi-bit error has been detected, 830. If the checksum does not match an entry in the table, 815, aliasing has occurred and an uncorrectable multi-bit error has been detected, 830.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    generating an 8-bit checksum value corresponding to a 64-bit data value using a polynomial equation;
    concatenating the 8-bit checksum value and the 64-bit data value to form a 72-bit data block;
    storing the 72-bit data block in a memory;
    reading the 72-bit data block from the memory;
    generating a new checksum value for the 72-bit data block read from memory using the polynomial equation; and
    initiating error correction operations on either 1-bit persistent faults from one dynamic random access memory (DRAM or 8-bit permanent faults from the one DRAM if the new checksum value indicates an error, wherein the 8-bit checksum provides single-bit error correction and ×8 Single Data Device Correction (SDDC) for permanent faults, and one-bit transient faults are removed utilizing a look up table and data inversion testing, and wherein nine 8-bit wide memory chips are utilized for ×8 SDDC.

2. The method of claim 1 wherein the 8-bit checksum value is generated on a 72-bit value comprising the 64-bit data value with 8 leading zero bits.

3. The method of claim 1 wherein the 8-bit checksum value is generated using the polynomial: $P(x)=x^8+x^5+x^3+x^2+x+1$.

4. The method of claim 1 wherein the 8-bit checksum value is generated using the polynomial: $P(x)=x^8+x^2+1$.

5. The method of claim 1 wherein initiating error correction operations if the new checksum value indicates an error comprises:
    inverting the data bits;
    writing the inverted data bits to memory;
    reading the inverted data bits from memory;
    comparing the inverted data bits from memory to the inverted data bits to determine if a bit error has occurred; and
    correcting the bit error.

6. The method of claim 1 wherein initiating error correction operations if the new checksum value indicates an error comprises:
    generating checksum values for a plurality of iterations of potential corrected data values;
    evaluating the checksum values generated for the potential corrected data values;
    selecting a potential corrected data value corresponding to a checksum value indicating no error;
    designating the potential corrected data value corresponding to the checksum value indicating no error as a correct data value; and
    returning the correct data value.

7. The method of claim 1 further comprising:
    maintaining a table of known permanent errors; and
    using the table to correct data errors when the new checksum value indicates a data error.

8. A system comprising:
    a memory having a plurality of memory devices; and
    a memory controller coupled with the memory to generate an 8-bit checksum value corresponding to a 64-bit data value using a polynomial equation, to concatenate the 8-bit checksum value and the 64-bit data value to form a 72-bit data block and to cause the 72-bit data block to be stored in the memory, the memory controller further to read the 72-bit data block from the memory, to generate a new checksum value for the 72-bit data block read from memory using the polynomial equation, and to initiate error correction operations on either 1-bit persistent faults from one dynamic random access memory (DRAM or 8-bit permanent faults from the one DRAM if the new checksum value indicates an error, wherein the 8-bit checksum provides single-bit error correction and ×8 Single Data Device Correction (SDDC) for permanent faults, and one-bit transient faults are removed utilizing a look up table and data inversion testing, and wherein nine 8-bit wide memory chips are utilized for ×8 SDDC.

9. The system of claim 8 wherein the 8-bit checksum value is generated on a 72-bit value comprising the 64-bit data value with 8 leading zero bits.

10. The system of claim 8 wherein the 8-bit checksum value is generated using the polynomial: $P(x)=x^8+x^5+x^3+x^2+x+1$.

11. The system of claim 8 wherein the 8-bit checksum value is generated using the polynomial: $P(x)=x^8+x^2+1$.

12. The system of claim 8 wherein initiating error correction operations if the new checksum value indicates an error comprises the memory controller:
    inverting the data bits;
    writing the inverted data bits to memory;
    reading the inverted data bits from memory;
    comparing the inverted data bits from memory to the inverted data bits to determine if a bit error has occurred; and
    correcting the bit error.

13. The system of claim 8 wherein initiating error correction operations if the new checksum value indicates an error comprises the memory controller:
    generating checksum values for a plurality of iterations of potential corrected data values;
    evaluating the checksum values generated for the potential corrected data values;
    selecting a potential corrected data value corresponding to a checksum value indicating no error;
    designating the potential corrected data value corresponding to the checksum value indicating no error as a correct data value; and
    returning the correct data value.

14. The system of claim 8 further comprises the memory controller:
    maintaining a table of known memory components with permanent errors; and using the table to correct data errors when the new checksum value indicates a data error.

\* \* \* \* \*